Dec. 27, 1966  W. G. McCLEAN  3,293,927
CHAIN LOCKING MECHANISM
Filed Jan. 13, 1964  2 Sheets-Sheet 1

INVENTOR.
W. GEORGE McCLEAN
BY
Andrus & Starke
ATTORNEYS

Dec. 27, 1966  W. G. McCLEAN  3,293,927
CHAIN LOCKING MECHANISM
Filed Jan. 13, 1964  2 Sheets-Sheet 2
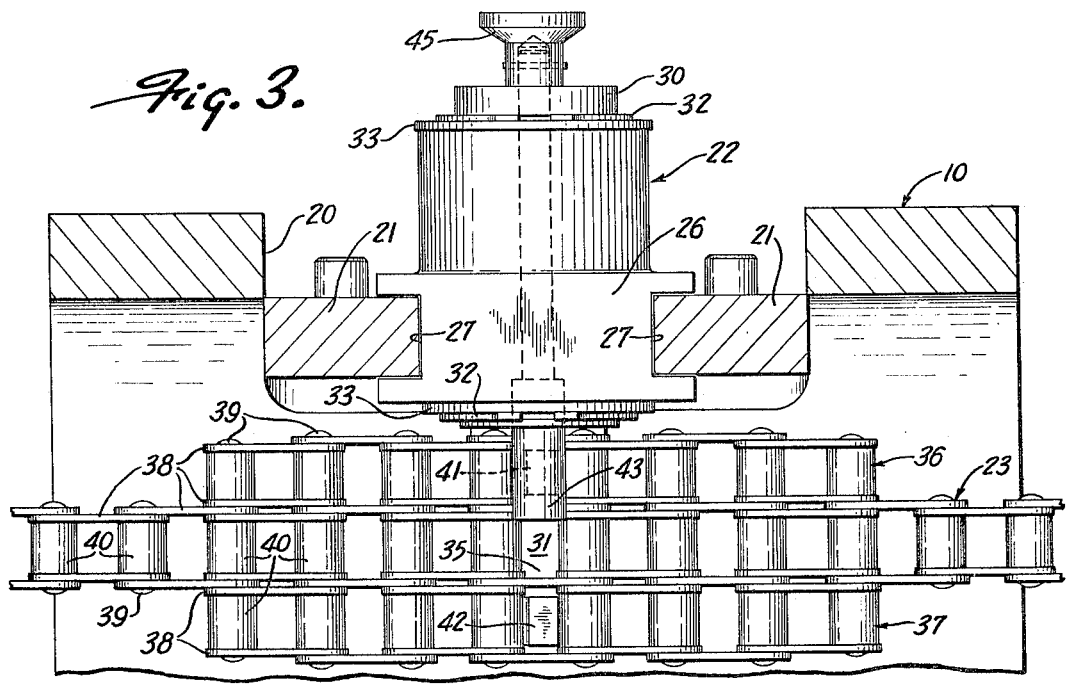
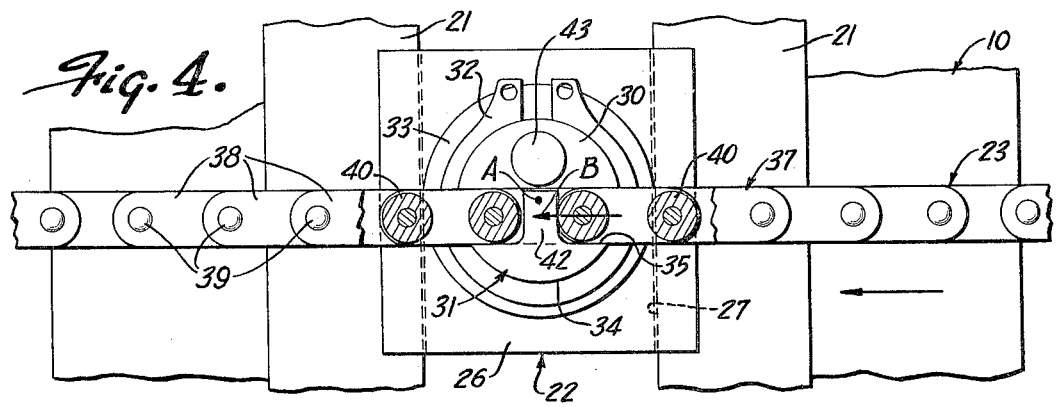
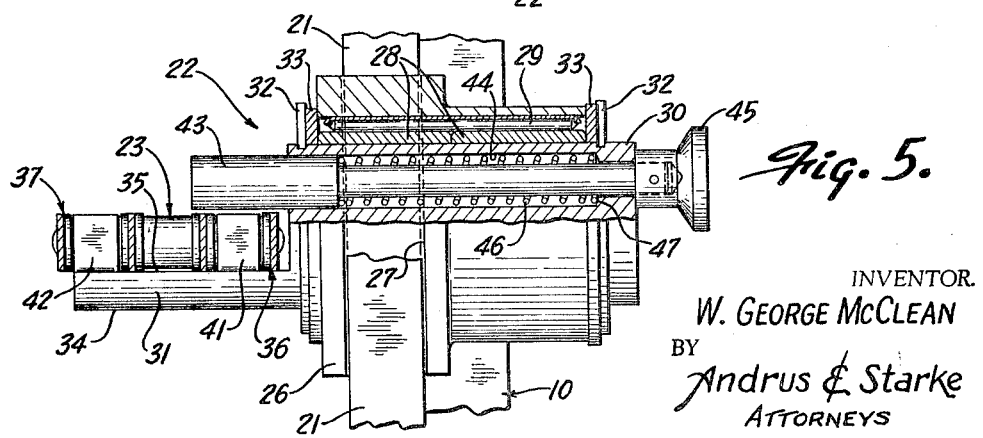
INVENTOR.
W. GEORGE McCLEAN
BY
Andrus & Starke
ATTORNEYS

United States Patent Office 3,293,927
Patented Dec. 27, 1966

3,293,927
CHAIN LOCKING MECHANISM
William George McClean, Milwaukee, Wis., assignor to McClean-Anderson, Inc., Milwaukee, Wis., a corporation of Wisconsin
Filed Jan. 13, 1964, Ser. No. 337,321
9 Claims. (Cl. 74—37)

This invention relates to a filament winding apparatus and more particularly to a mechanism for locking the reciprocating carriage of a winding head to an endless drive member.

Tubular reinforced plastic articles are generally fabricated by winding a strand or filament of reinforcing material coated with a resin about a mandrel in a generally helical pattern. In the conventional process, the mandrel is rotated and a winding head reciprocates along the length of the mandrel to wind the strand on the mandrel in a series of superimposed layers with each layer having the opposite helix angle.

In the usual filament winding apparatus, the winding head includes a carriage which is movable along a track or guide rail and carries a guide mechanism which guides the strand or filament onto the mandrel. The carriage is connected to an endless drive chain by extending one of the roller link pins of the chain and journalling the outer end of the pin within a slide which is slidable mounted within a vertical slot in the carriage. The chain is trained over sprockets located at the ends of the mandrel, and as the connecting pin approaches one of the sprockets at the end of the path of travel of the chain, the slide moves vertically within the slot in the carriage to maintain the attachment of the carriage to the chain as the chain moves around the sprocket and reverses its path of travel.

In the conventional filament winding apparatus, the carriage is permanently secured to the chain by the extended roller link pin so that it is necessary to break the chain in order to release the carriage from the chain.

The present invention is directed to an improved mechanism for locking the carriage of a winding head to an endless chain which permits the carriage to be readily engaged and disengaged without breaking the chain. More specifically, the drive chain is provided with three separate sections or lengths disposed in a side-by-side relation, with the middle section being endless and being trained around sprockets at the ends of the mandrel. The outer sections of the chain extend throughout at least a portion of the length of the central section. The slide, which is adapted to move vertically within the slot in the carriage as the chain travels around the sprockets, is provided with a barrel which is journalled for rotation in an opening in the slide. The barrel is provided with an extension which extends outwardly from the slide and is connected to the three-section drive chain. Ears or projections are formed on the barrel extension and are located in a position to engage the two outer sections of the three-section chain.

One of the outer chain sections is locked to the ears on the barrel extension by a locking pin which is urged into a position in proximate relation to the ear and prevents the chain from being disengaged from the ear.

The mechanism of the invention provides a simple and expedient means for attaching and releasing the carriage from the endless drive chain without having to break the chain. The carriage can be readily attached by merely withdrawing the locking pin and engaging the two outer chain sections with the ears on the barrel extension. By releasing the locking pin, the chain is locked to the barrel extension and the carriage will then travel in a reciprocating path of travel in accordance with chain movement. As the carriage approaches a sprocket at an end of the path of chain travel, the slide will move vertically within the carriage slot and the barrel will rotate within the slide to thereby maintain the connection as the chain travels around the sprocket and reverses its path of travel.

Other objects and advantages will appear in the course of the following description.

The drawings illustrate the best mode presently contemplated of carrying out the invention.

In the drawings:

FIG. 3 is an enlarged fragmentary horizontal section taken along line 3—3 of FIG. 2;

FIG. 4 is an enlarged fragmentary front elevation of the locking mechanism connecting the carriage to the drive chain; and FIG. 5 is an enlarged fragmentary side elevation of the chain locking mechanism with parts broken away in section.

Figure 1:
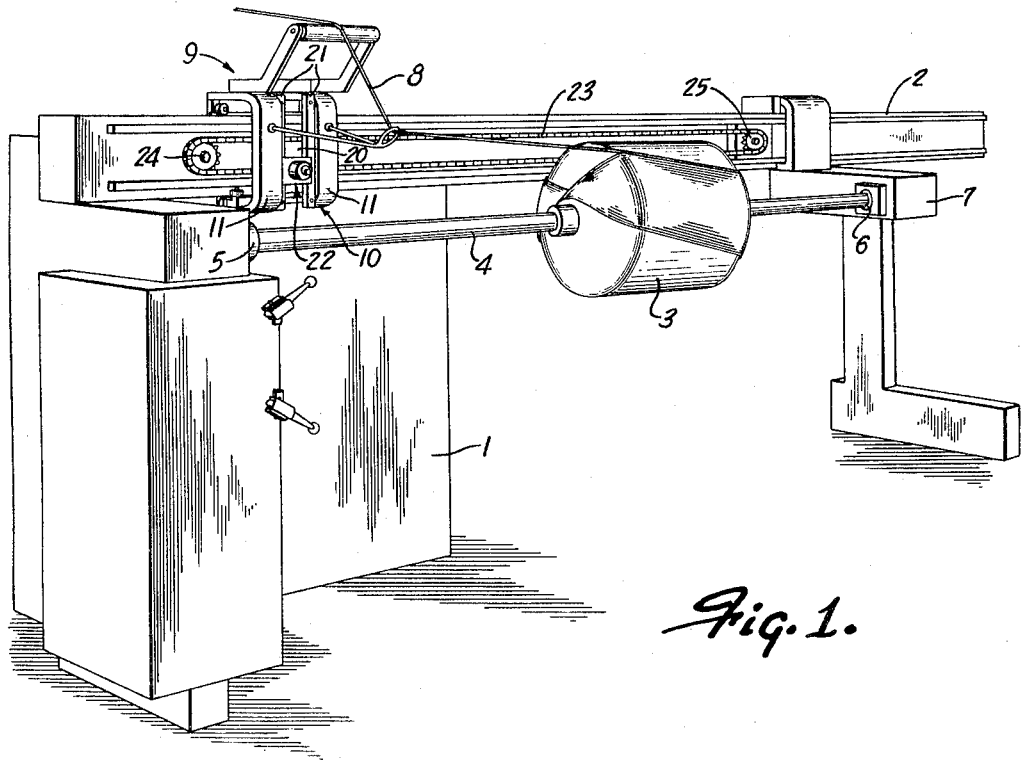
FIG. 1 is a perspective view of a filament winding machine employing the chain locking mechanism of the invention.

The drawings illustrate a filament winding apparatus which comprises a base cabinet 1 or casing and a generally horizontal beam or guide rail 2 extends outwardly from the cabinet 1. A mandrel 3 is secured to a shaft 4 which is disposed generally parallel to the beam 2. One end of the shaft 4 is secured to a spindle 5 which is operably connected to a drive mechanism located within the cabinet 1. The other end of the shaft 4 is secured to a spindle 6 journalled within a tailstock 7 which is movable along the beam 2.

A strand of reinforcing material 8 is adapted to be wound on the outer surface of the mandrel 3 in a generally helical pattern to form a tubular article. Strand 8 can be in the form of substantially continuous, unidirectional fibers, woven fabric, braided tubing, matting, or the like. The fibrous material can be mineral fibers, such as glass or asbestos; vegetable fibers, such as cotton; animal fibers, such as wool; synthetic fibers, such as nylon or rayon; or metal fibers, such as steel wire.

The strand 8 is impregnated or coated with a thermoplastic or thermosetting resin. Glass fibers impregnated with an expoxide resin formed by the reaction of epichlorohydrin and bisphenol-A, as disclosed in Patent 2,801,277, is a very satisfactory material to use in the winding operation.

Figure 2:
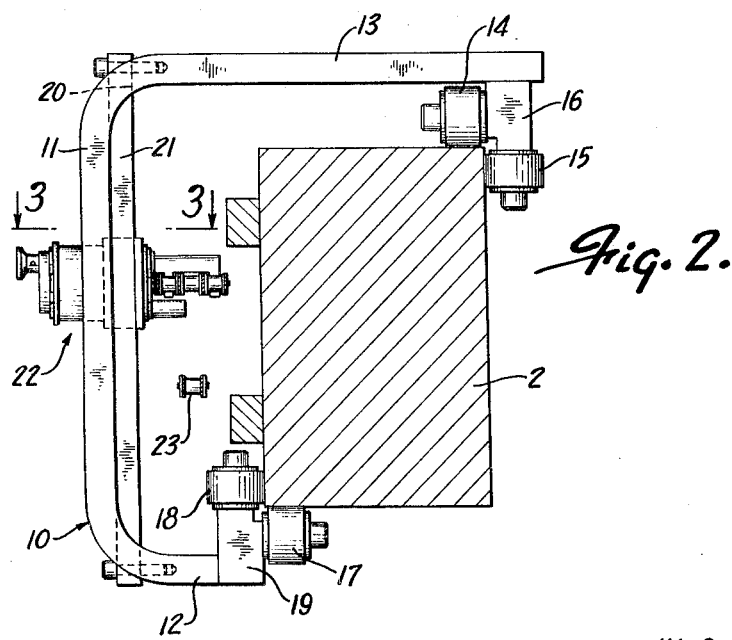
FIG. 2 is a transverse section showing the attachment of the carriage to the longitudinal beam or guide member.

The strand is guided onto the mandrel 3 by a winding head 9 which is mounted for reciprocating movement on the beam 2. As best shown in FIG. 2, the winding head 9 includes a carriage 10 having a front vertical section 11, a top horizontal section 12 and a bottom horizontal section 13. A pair of rollers 14 and a pair of rollers 15 are rotatably mounted on a bar 16 secured to section 12, and the rollers 14 are adapted to ride along the upper surface of the beam 2, while the rollers 15 engage the side surface of the beam.

In addition, a pair of rollers 17 and a pair of rollers 18 are rotatably mounted on a bar 19 which extends upwardly from bottom section 13. The rollers 17 are adapted to engage the bottom surface of the beam 2, while the rollers 18 ride along the outer surface of the beam.

The front section 11 of the carriage is provided with a vertical slot 20, and a pair of guide rails 21 are secured in spaced relation within the slot 20. A connecting member 22 is mounted for sliding movement on the rails 21.

The connecting member 22 is adapted to connect the carriage 10 to an endless drive chain 23 which is trained over a drive sprocket 24 and idler sprocket 25 located at the ends of the beam 2. The connecting member 22 includes a slide or block 26 having grooves 27 along the opposite side edges which are adapted to engage the guide rails 21. The connecting member 22 is provided with a central opening and a pair of bearing sleeves 28 are journalled in an end-to-end relation within the opening by a roller bearing assembly 29. A barrel 30 is located within the sleeves 28 and the barrel is provided with an extension 31 which extends outwardly to a position adjacent the chain 23. The barrel 30 is secured within the opening in the member 22 by a pair of snap rings 32 which are engaged within suitable grooves formed in the outer surface of the barrel. Washers 33 are disposed between the snap rings 32 and the corresponding ends of the member 22.

The barrel extension 31 is provided with a curved lower surface 34 and an upper flat, shelf-like upper surface 35 which is in engagement with the chain 23.

As best shown in FIG. 3, a pair of short chain sections 36 and 37 are secured to opposite sides of the endless drive chain 23. Chain sections 36 and 37 can extend throughout the entire length of the chain 23, but for economy, generally extend only a short distance on either side of the connecting member 22. The chain 23, as well as the chain sections 36 and 37, are standard roller link chains, each of which includes a series of links 38 which are pivotally mounted on pins 39. Spacers 40 are located around the pins 39 to space the links 38 apart.

The chain sections 36 and 37 are locked to the barrel extension 31 by a pair of ears 41 and 42 which projects outwardly from the flat, shelf-like surface 35. The ear or tooth 41 is adapted to engage the chain section 36, while the ear 42 engages the chain section 37. While a single chain section, such as 36 and 37, and a single ear, such as 41 or 42, can be employed, it is preferred to have a chain section on either side of the endless chain 23 so that the forces will be balanced and jamming of the drive chain will be prevented.

To lock the drive chain 23 to the barrel extension 31, a lock pin 43 extends outwardly from the barrel 30 over the ear 41, and when in the position shown in FIGS. 3–5, prevents the chain section 36 from being disengaged from the ear 41. The lock pin 43 extends through an opening 44 in the barrel 30, and the outer end of the pin is provided with a pull knob 45. The pin 43 is biased outwardly to a position over the ear 41 by a coil spring 46 which is located between the enlarged head of the pin 43 and a shoulder 47 formed in the barrel 30. The spring 46 urges the lock pin outwardly to a position over the ear 41. By pulling on the knob 45, the pin 43 can be withdrawn against the force of the spring and the chain section 36 can then be released from engagement with the ear 41.

The connecting member 22 is attached to the chain drive of the carriage by initially withdrawing the knob 45 so that the lock pin 43 is withdrawn from its position above ear 41. The upper surface 35 is then positioned against the chain 23 and the chain sections 36 and 37 with the ears 41 and 42 projecting between the links of the chain sections 36 and 37, respectively. The knob 45 is then released, forcing the lock pin 43 outwardly over the ear 41 to lock the barrel to the chain.

As the carriage 10 moves to the left in FIG. 1, the connecting member 22 is attached to the portion of the chain 23 moving in the lower level of travel and the barrel extension 31 would be in an inverted position with respect to its position, as shown in FIGS. 2–5. In the inverted position, the ears 41 and 42 would be projecting downwardly and the pin 43 would be located beneath the ear 41. In this position, the locking pin 43 serves to prevent the chain from falling by gravity out of engagement with the connecting member 22. As the carriage 10 reaches sprocket 24, the barrel 30 will rotate within the slide 26 and the slide will move vertically within the slot 29. The pin 43 takes the outward thrust of the chain as the chain moves upwardly around the sprocket 24. As the chain moves in its reverse path of travel toward sprocket 25, the barrel 30 will have been rotated 180° so that the ears 41 and 42 extend upwardly, as shown in FIGS. 2–5.

As best shown in FIG. 4, the axis of rotation A of the barrel 30 should be offset from the direction of the chain force against the ears 41 and 42, indicated by the arrow B in FIG. 4, should be in alignment with the axis A of rotation of the barrel, or offset between the axis A and the surface 34, so that the moment arm developed by the force about axis A will tend to rotate the barrel in the direction of the arrow B to firmly lock the chain to the ears 41 and 42.

The mechanisem for locking the carriage of the winding head to the endless chain is a decided improvement over conventional devices of this type in that it permits the carriage to be attached and released without having to break the chain. This substantially reduces the time involved for re-attachment or release of the carriage.

As the chain engaging members, represented by ears 41 and 42, engage the outer sections 36 and 37 and do not engage the endless chain section 23 which travels over the sprockets, there is no problem of interference between the chain locking mechanism and the sprockets. Furthermore, the pin 43 prevents disengagement of the ears 41 and 42 from the chain sections 36 and 37 as the chain sections follow chain 23 around the sprockets, as well as preventing disengagement when the barrel 31 is in an inverted position.

While the above description is directed to the chain locking mechanism as associated with a filament winding apparatus, the locking mechanism can be used in any situation where it is desired to removably secure or lock a chain to a driven element.

Various modes of carrying out the invention are contemplated as being within the scope of the following claims particularly pointing out and distinctly claiming the subject matter which is regarded as the invention.

I claim:

1. In an apparatus of the class described, an elongated drive member disposed to move in a path of travel, a plurality of supporting members lying in a common plane and supporting said drive member in movement in said path of travel, a second elongated member connected in side-by-side relation to said drive member and extending along at least a portion of the length of said drive member, said second elongated member traveling in a plane offset from said common plane whereby said second elongated member is unsupported and does not engage said supporting members during travel of said drive member, a movable member mounted for reciprocating movement, and releasable connecting means for connecting said movable member directly to said second elongated member, said connecting means being free of engagement with said elongated drive member to thereby enable said drive member to pass freely over said supporting members.

2. In an apparatus of the class described, a flexible endless drive member disposed to move in an endless path of travel, a plurality of supporting members supporting said drive member in movement in said path of travel, a second flexible member disposed in side-by-side relation with said drive member and extending along at least a portion of the length of said drive member, a third flexible member disposed in side-by-side relation with said drive member and located on the opposite side from said second flexible member, said third flexible member extending along at least a portion of the length of said drive member and being at least partially coextensive with said second drive member, said second and third flexible members being disposed out of engagement with said supporting members as the drive member moves in its path of travel, a movable member mounted for reciprocating movement, and connecting means for releasably connecting said movable member to said second and third flexible members, said connecting means being free of engagement with said drive member to thereby enable said drive member to pass freely over said supporting members.

3. In an apparatus of the class described, an endless drive chain disposed to move in a path of travel, a pair of sprockets supporting the chain and lying in a common plane, a chain section secured in side-by-side relation to the drive chain and extending along at least a portion of the length of said drive chain and offset from said common plane, a carriage mounted for reciprocating movement, and means for removably connecting the carriage to said chain section, said means being free of engagement with said drive chain to thereby enable said drive chain to travel freely around said sprockets.

4. In an apparatus of the class described, an endless drive chain disposed to move in a path of travel, a pair of sprockets supporting the chain and lying in a common plane, a chain section secured in side-by-side relation to the endless drive chain and extending over at least a portion of the length of the drive chain, said chain section lying in a plane offset from said common plane whereby said second chain section does not engage said sprockets during travel of said drive chain, a carriage mounted for reciprocating movement and having a slot therein, a slide slidably disposed within the slot, a barrel mounted for rotation with respect to the slide and having an extension extending outwardly from the slide to a position adjacent the drive chain and chain section, and connecting means carried by said extension and engageable only with the chain section for connecting the barrel and the chain section to thereby enable said drive chain to travel freely around said sprockets.

5. In a filament winding machine, an endless drive chain trained over a plurality of sprockets, a first chain section disposed in side-by-side relation with the endless drive chain and extending over at least a portion of the length of the drive chain, a second chain section disposed on the opposite side of the drive chain from said first chain section and extending along at least a portion of the length of the drive chain and being substantially coextensive with the first chain section, said first and second chain sections being free of engagement with said sprocket as said drive chain moves in its path of travel, a carriage mounted for reciprocating movement and having a slot therein, rotatable slide means slidably mounted in the slot, said slide means having an extension extending transversely of said drive chain and said chain sections, and connecting means carried by said extension and releasably engageable with both the first chain second and the second chain section for operably connecting the rotatable slide means to the drive chain, said connecting means being free of direct engagement with said endless drive chain to permit the endless drive chain to move freely around said sprockets.

6. In an apparatus of the class described, an endless drive chain disposed to move in a path of travel, a pair of sprockets supporting the chain and disposed in a common plane, a chain section secured in side-by-side relation to the endless drive chain and extending over at least a portion of the length of the drive chain, said chain section disposed in a plane offset from said common plane whereby said chain section does not engage said sprockets during travel of said drive chain, a carriage mounted for reciprocating movement and having a slot therein, a slide slidably disposed within the slot, a barrel mounted for rotation with respect to the slide, said barrel having an extension extending outwardly from the slide and defining a supporting surface to support the chain and the chain section, an ear extending outwardly from said supporting surface and disposed in engagement with the chain section, and releasable locking means for preventing disengagement of the ear with said chain section.

7. In an apparatus of the class described, an endless drive chain trained over a plurality of sprockets, a first chain section disposed in side-by-side relation with the endless drive chain and extending over at least a portion of the length of the drive chain, a second chain section disposed on the opposite side of the drive chain from said first chain section and extending along at least a portion of the length of the drive chain and being substantially coextensive with the first chain section, a carriage mounted for reciprocating movement and having a slot therein, a slide slidably mounted in the slot, a rotatable member mounted for rotation on the slide member, said rotatable member having an extension extending outwardly from the slide and defining a generally flat supporting surface to support the endless chain and the first and second chain sections, a pair of ears extending outwardly from the supporting surface in spaced relation with one of said ears being disposed in engagement with the first chain section and the other of said ears being disposed in engagement with the second chain section, said ears being free of direct engagement with said endless chain, and a locking member carried by the rotatable member and disposed to cooperate with at least one of said ears to prevent disengagement of the ear from the respective chain section.

8. The structure of claim 7 in which the locking member is resiliently biased to a locking position in proximate relation to said ear.

9. The structure of claim 6 in which the locking means is located on the opposite side of the chain from said extension.

References Cited by the Examiner

UNITED STATES PATENTS

| | | | |
|---|---|---|---|
| 1,637,078 | 7/1927 | Hill | 74—37 |
| 1,935,585 | 11/1933 | Tornblom | 74—37 X |
| 2,382,102 | 8/1945 | Salstrom et al. | 74—37 X |
| 2,544,484 | 3/1951 | Blackburn | 74—37 |
| 2,544,485 | 3/1951 | Blackburn | 74—37 |
| 2,564,816 | 8/1951 | Rehwald | 74—37 |

FRED C. MATTERN, Jr., *Primary Examiner.*

BROUGHTON G. DURHAM, *Examiner.*

F. E. BAKER, *Assistant Examiner.*